United States Patent [19]

Lin

[11] Patent Number: 5,279,326
[45] Date of Patent: Jan. 18, 1994

[54] SAFETY VALVE

[76] Inventor: Chi-San Lin, No. 5, Alley 14, Lane 298, Hsin Ming Rd., Neihu, Taipei, Taiwan

[21] Appl. No.: 6,566

[22] Filed: Jan. 21, 1993

[51] Int. Cl.⁵ ............................. F16K 17/164
[52] U.S. Cl. ..................... 137/460; 137/517; 137/557
[58] Field of Search ............... 137/517, 460, 557

[56] References Cited

U.S. PATENT DOCUMENTS

| | | | |
|---|---|---|---|
| 2,357,321 | 9/1944 | Fuller | 137/460 |
| 3,259,144 | 7/1966 | Taplin | 137/557 X |
| 3,331,389 | 7/1967 | Kirk | 137/517 X |
| 3,779,273 | 12/1973 | Stone et al. | 137/460 |
| 4,269,215 | 5/1981 | Odar | 137/517 X |
| 4,494,570 | 1/1985 | Adkins | 137/517 X |
| 5,152,318 | 10/1992 | Ortner et al. | 137/557 |

FOREIGN PATENT DOCUMENTS 23012 of 1914 United Kingdom ................ 137/460

Primary Examiner—Stephen M. Hepperle
Attorney, Agent, or Firm—Quarles & Brady

[57] ABSTRACT

A safety valve includes a tube and a valve device. The valve device is substantially a cylindrical member with an end thereof coupled to an outlet of a gas container by a mounting device. The other end of the valve device has a threading portion for engaging with a first end of the tube whose second end communicates with a burner. The valve device has an inner gas passage which tapers to form a neck adjacent to the threading portion thereof. A stem hole is formed in the threading portion and communicates with the neck. Also formed in the threading portion are two slits which also communicate with the neck. A valve stem has a stem portion received in the stem hole and a valve head in the inner gas passage. When leakage occurs downstream of the valve device, the valve stem is moved toward the neck, and thus blocks the slits, thereby preventing from escapement of subsequent gas remained in the inner gas passage and in the gas container.

3 Claims, 4 Drawing Sheets

SAFETY VALVE

BACKGROUND OF THE INVENTION

The present invention relates to a safety valve and, more particularly, to a safety valve which cuts off the gas supply from a gas container when leakage occurs.

Gas containers are widely used to supply gas to burners. A gas container generally incorporates a safety valve to prevent damage resulting from gas leakage. Accidents, however, still possibly occur when the leakage occurs in the threadings portion of the safety valve in the situation where the safety valve fails.

Therefore, there has been a long and unfulfilled need for an improved safety valve to mitigate and/or obviate the above-mentioned problems.

SUMMARY OF THE INVENTION

The present invention provides a safety valve which includes a tube, a valve means, a mounting means for mounting the valve means, and a return means.

The valve means is substantially a cylindrical member with an end thereof coupled to an outlet of a gas container. The valve means is secured in position by the mounting means. The other end of the valve means has a threading portion for engaging with a first end of the tube whose second end communicates with a burner. The mounting means is substantially a hollow member allowing the valve means to pass through.

The valve means has an inner gas passage which tapers to form a neck adjacent to the threading portion thereof. A stem hole is formed in the threading portion and communicates with the inner gas passage. Also formed in the threading portion are two slits which also communicate with the inner gas passage. A valve stem is provided with a stem portion thereof received in the stem hole and a valve head thereof in the inner gas passage.

When leakage occurs downstream of the valve means, the valve stem is moved toward the neck to block the slits by the valve head, thereby preventing from escapement of subsequent gas remaining in the inner passage and in the gas container.

The return means is mounted on the tube and includes a rod with an actuating head. After the leak cause is relieved, the return means is pressed at a button thereof which is integral with the rod. The actuating head is moved to impinge the distal end of the valve stem, thereby urging the valve stem back to its original position.

Other objects, advantages, and novel features of the invention will become more apparent from the following detailed description when taken in conjunction with the accompanying drawings.

DETAILED DESCRIPTION OF THE PREFERRED EMBODIMENTS

Figure 4:
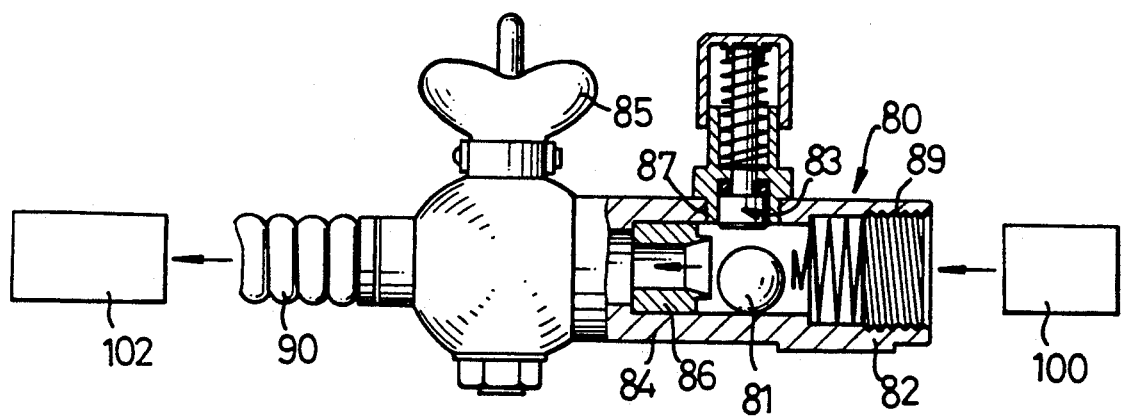
FIG. 4 shows a safety valve according to prior art.

For a better understanding of the present invention, reference is made to FIG. 4 which shows a safety valve according to prior art. The safety valve generally includes a tube 80 having a first end 82 which communicates with an outlet 100 of a gas container and a second end 84 which communicates with a burner 102 via a tap 85 and a pipe 90. Gas from the container passes through a neck 86 formed in the tube 80. When leakage occurs in the downstream of the safety valve, e.g., in the burner 102, a large quantity of gas escapes from the container and thus causes the ball 81 in the tube 80 to move leftward to block the neck 86, thereby preventing from escapement of subsequent gas into environment. A return device 83 is provided on the tube 30 to return the ball 81 to its original position after the leakage problem is relieved. Such a safety valve, however, fails when leakage occurs in the threading portions 87 and 89 in the tube 80 for coupling.

Figure 1:
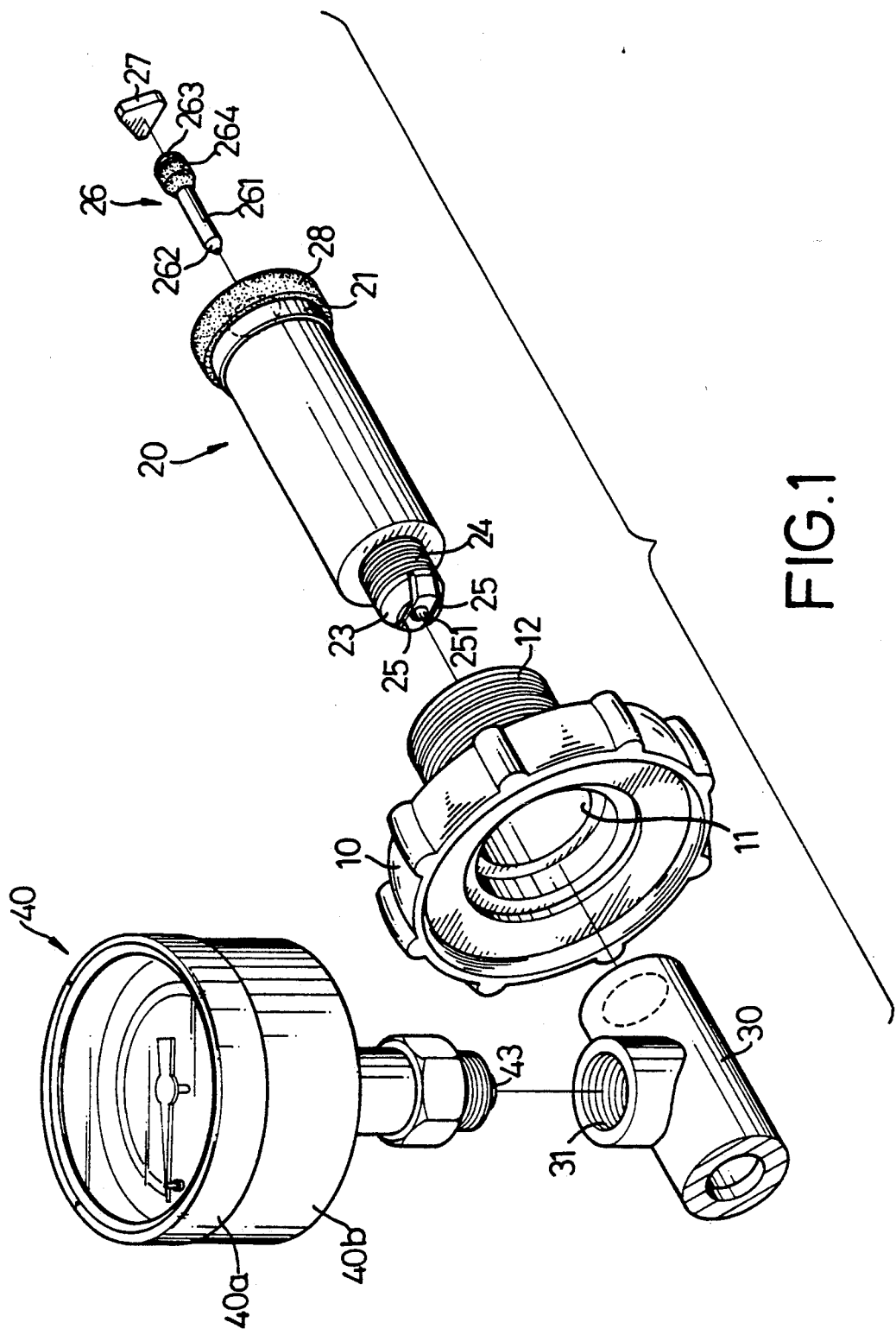
FIG. 1 is an exploded view of a safety valve in accordance with the present invention.
Figure 2:
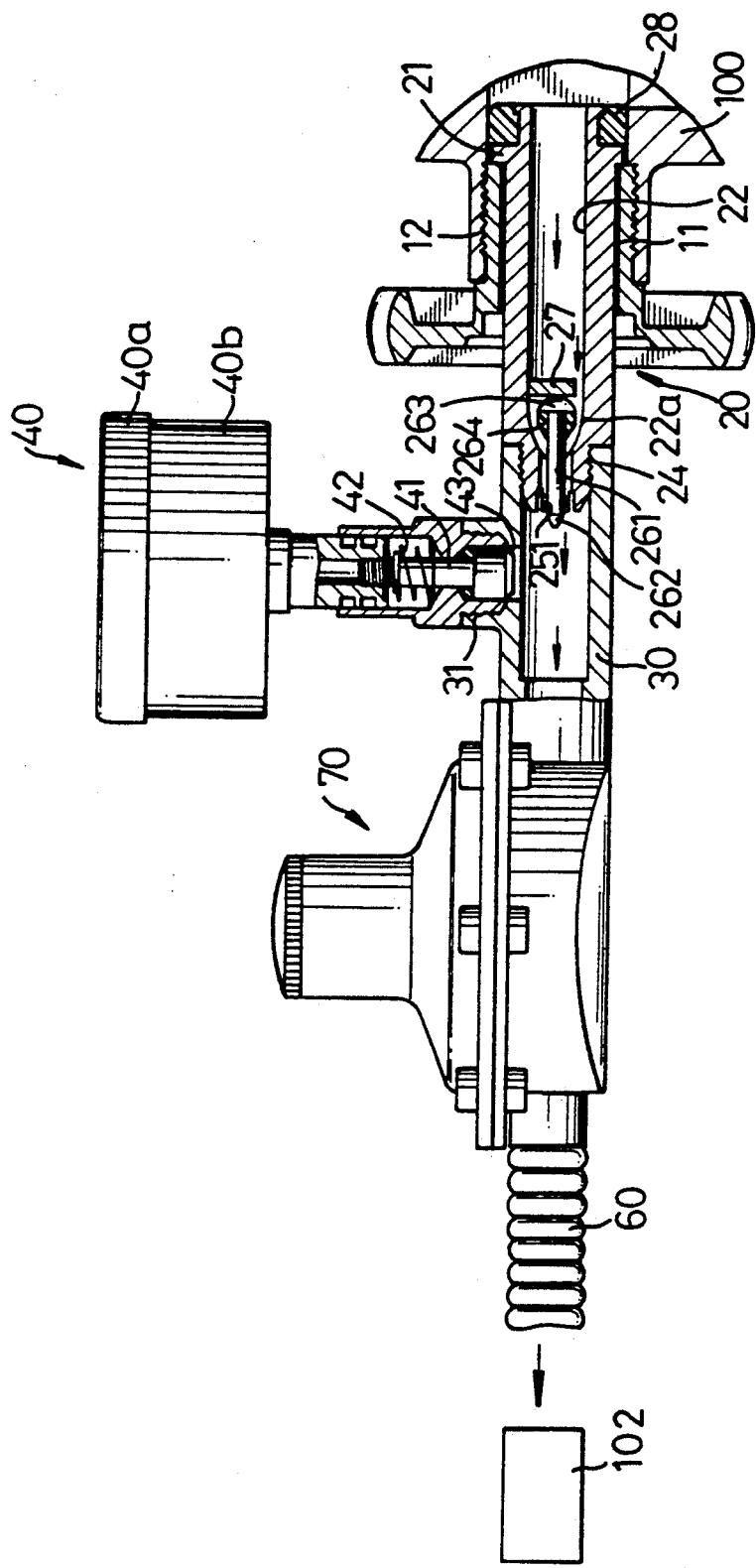
FIG. 2 is a cross-sectional view of the safety valve which is coupled between a gas regulator and a gas container.

In order to relieve the potential risk in conventional safety valve, the present invention provides an improved one to mitigate and/or obviate the above-mentioned problems. Referring now to FIGS. 1 and 2, the safety valve in accordance with the present invention generally includes a substantially T-shaped tube 30, a valve means 20, a mounting means 10 for mounting the valve means 20, and a return means 40.

The valve means 20 is substantially a cylindrical member with an end thereof coupled to an outlet 100 of a gas container. The other end of the valve means 20 has a threading portion 24 for engaging with a first end of the tube 30 whose second end is coupled to a gas regulator 70. The mounting means 10 is substantially a hollow member (see compartment 11) allowing the valve means 20 to pass through. The hollow member has a knob portion 10 for grasping and an outer threading portion 12 for engaging with internal threading in the outlet 100 of the gas container. As shown in FIG. 2, the valve means 20 has a flange 21 which abuts the distal end of the threading portion 12 of the mounting means, and the threading portion 24 of the valve means 20 engages with the T-shaped tube, thereby securing the valve means 20 in position. The valve means 20 may have a sealing 28 adjacent to the flange 21 to avoid leakage occurring upstream of the valve means 20.

Still referring to FIGS. 1 and 2, the valve means 20 has an inner gas passage 22 which tapers to form a neck 22a adjacent to the threading portion 24. A stem hole 251 is formed in the threading portion 24 and communicates with the inner gas passage 22. Also formed in the threading portion 24 are two slits 25 which are independent from the stem hole 251 and also communicate with the inner gas passage 22. A valve stem 26 is received in the inner gas passage 22, with a stem portion 261 received in the stem hole 251 and a valve head 263 in the inner gas passage 22. A substantially triangular member 27 is securely received in the inner gas passage 22, whose function and operation will be illustrated later.

The return means 40 is mounted on the T-shaped tube 30 and includes a rod 41 with an actuating head 43 and a spring 42 mounted around the rod 41, which will be illustrated later. Preferably, the return means 40 may incorporate a pressure gauge 40a mounted on a button 40b which is integral with the rod 41.

Figure 3:
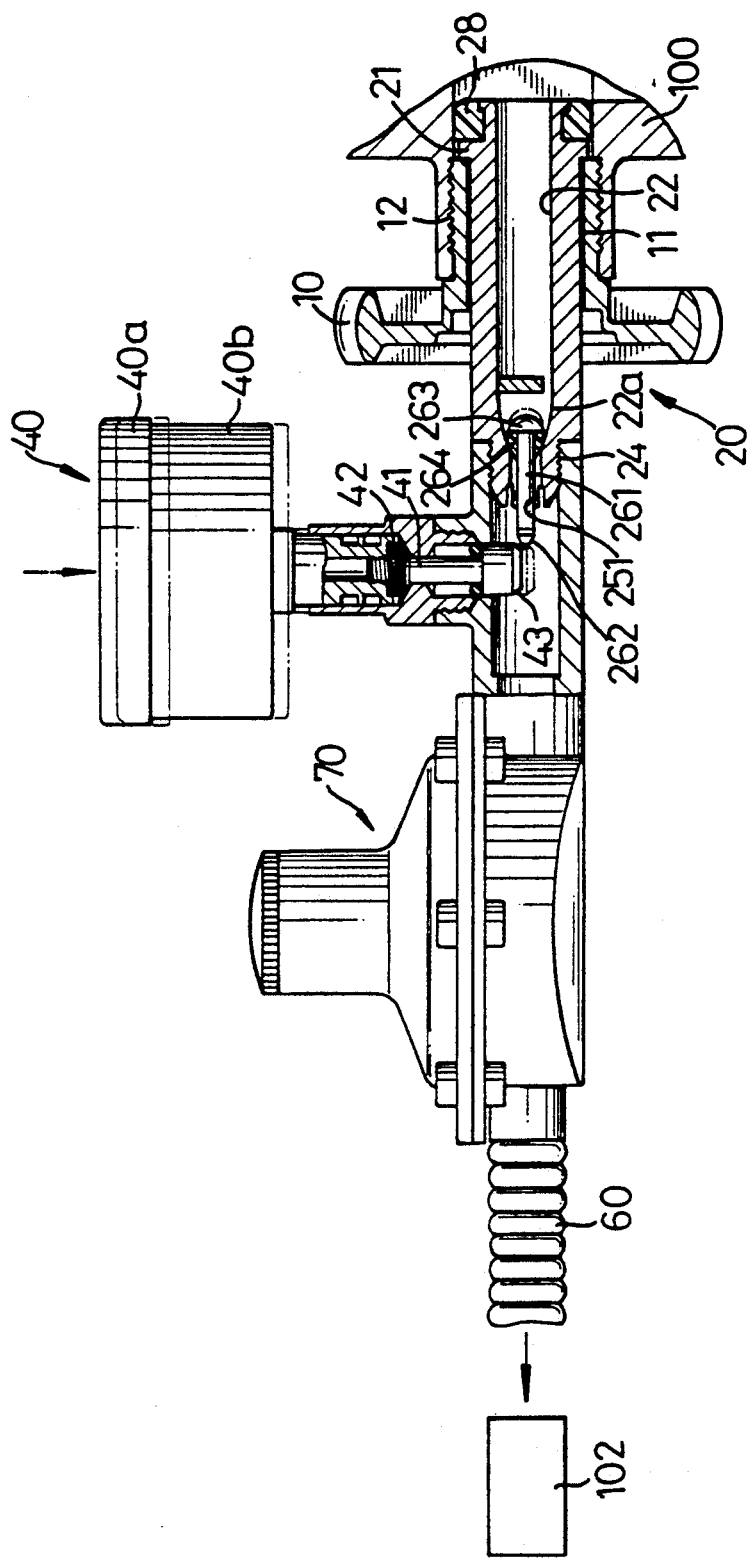
FIG. 3 is a view similar to FIG. 2, illustrating the operation of the safety valve.

In normal operation, gas from the container exits at the outlet 100 and then passes through the interspace between the inner gas passage 22 and the triangular member 27, the slits 25, the tube 30, the regulator 70, and the pipe 60 to the burner 102. The triangular member 27 is provided to prevent the stem 26 from being directly impacted by the gas. When a leakage occurs downstream of the valve means 20, e.g., the coupling (threading) area of the regulator 70, the T-shaped tube 30, and/or the return means 40, gas in the container exits the outlet 100 at high speed, which causes the valve stem 26 to move leftward toward the neck 22a, and thus blocks the slits 25, thereby preventing from escapement of subsequent gas remaining in the inner gas passage and in the gas container (see FIG. 3).

After the leakage is relieved, the return means 40 is pressed at the button 40b thereof. The actuating head 43 is moved downward to impinge the distal end 262 of the valve stem 26, thereby urging the valve stem 26 back to its original position. As can be seen in the figures, the valve stem 26 moves between the neck 22a and the triangular member 27. Preferably, a sealing means 264 may be provided on the valve head 263 to prevent leakage. The sealing means 264 is complimentary to the neck 22a so as to fittingly "block" the slits 25 when leakage occurs.

Although the invention has been explained in relation to its preferred embodiment, it is to be understood that many other possible modifications and variations can be made without departing from the spirit and scope of the invention as hereinafter claimed.

I claim:

1. A safety valve comprising:
    a valve means having a first end and a second end, said valve means defining an inner gas passage communicating with an outlet of a gas burner at said first end thereof, said inner gas passage tapering at said second end thereof to form a neck, a stem hole being formed in said second end and communicating with said inner gas passage, a slit means, independent from said stem hole, being formed in said second end and communicating with said inner gas passage to allow gas passing through under normal operation condition, a valve stem having a stem portion received in said stem hole and a valve head in said inner passage;
    a mounting means for removably and securely mounting said first end of said valve means to said outlet of said gas container;
    a tube having a first end removably and securely coupled to said second end of said valve means and a second end communicating with a burner;
    a member securely received in said inner gas passage and defining an interspace between said member and said valve means to allow gas to pass through;
    whereby when leakage occurs downstream of said valve means, said valve stem is moved toward said neck to block said slit means, thereby preventing from escapement of subsequent gas remained in said inner gas passage and in said gas container;
    said safety valve further comprising a return means mounted to said tube and including a button, a pressure gauge mounted on said button, and a rod projecting from said button, said rod having an actuating head which is moved to impinge a distal end of said valve stem after the leakage is relieved, thereby urging said valve stem back to its original position.

2. The safety valve as claimed in claim 1 wherein said valve means has a sealing adjacent to said first end thereof to avoid leakage occurring upstream of said valve means.

3. The safety valve as claimed in claim 1 wherein a sealing means is provided on said valve head.

* * * * *